(12) United States Patent
Lee (10) Patent No.: US 7,275,867 B2
(45) Date of Patent: Oct. 2, 2007

(54) PROBE ASSEMBLY OF INFRARED THERMOMETER

(75) Inventor: Herman Lee, Hsinchu (TW)

(73) Assignee: Oriental System Technology Inc., Hsinchu (TW)

( * ) Notice: Subject to any disclaimer, the term of this patent is extended or adjusted under 35 U.S.C. 154(b) by 0 days.

(21) Appl. No.: 11/290,607

(22) Filed: Dec. 1, 2005

(65) Prior Publication Data

US 2007/0127545 A1 Jun. 7, 2007

(51) Int. Cl.
*G01K 1/16* (2006.01)
*G01J 5/12* (2006.01)
*G01J 5/06* (2006.01)

(52) U.S. Cl. .................... 374/208; 374/121; 374/179; 374/163; 600/474

(58) Field of Classification Search ............... 374/130, 374/131, 121, 120, 208, 163; 600/474
See application file for complete search history.

(56) References Cited

U.S. PATENT DOCUMENTS

| | | | |
|---|---|---|---|
| 4,895,164 A | 1/1990 | Wood | |
| 5,018,872 A | 5/1991 | Suszynski et al. | |
| 6,129,673 A * | 10/2000 | Fraden | 600/474 |
| 6,152,595 A * | 11/2000 | Beerwerth et al. | 374/131 |
| 6,292,685 B1 | 9/2001 | Pompei | |
| 6,402,371 B2 * | 6/2002 | Pompei et al. | 374/128 |
| 6,572,264 B1 * | 6/2003 | Egawa | 374/133 |
| 6,991,368 B2 * | 1/2006 | Gerlitz | 374/121 |
| 7,108,419 B2 * | 9/2006 | Harr | 374/121 |
| 2002/0143257 A1 * | 10/2002 | Newman et al. | 600/474 |
| 2003/0016729 A1 * | 1/2003 | Lee et al. | 374/131 |
| 2004/0233968 A1 * | 11/2004 | Tabata et al. | 374/121 |

* cited by examiner

*Primary Examiner*—Gail Verbitsky
(74) *Attorney, Agent, or Firm*—Oliff & Berridge, PLC (57) ABSTRACT

A probe assembly of an infrared thermometer is capable of detecting the surface temperature of a thermal radiation source and is suitable for holding over human skin or inserting into a patient's ear canal for accurately taking human body temperature. The probe assembly comprises a taper plastic tube, a conductive shell, an infrared radiation sensor and an adiabatic supporter, wherein the plastic tube has a radiation collection end and the conductive shell has a first open end. The infrared radiation sensor is placed in the first open end of the conductive shell, and has a base against the adiabatic supporter. The infrared radiation sensor has a hot junction toward the first open end of the conductive shell and a cold junction toward the adiabatic supporter.

8 Claims, 7 Drawing Sheets

PROBE ASSEMBLY OF INFRARED THERMOMETER

BACKGROUND OF THE INVENTION

1. Field of the Invention

The present invention relates to a probe assembly of an infrared thermometer and more particularly to a probe assembly capable of detecting the surface temperature of a thermal radiation source and suitable for holding over human skin or inserting into a patient's ear canal for accurately taking human body temperature.

2. Description of the Related Art

The infrared thermometer is a kind of non-contact temperature measurement apparatus. It is adapted to aim at the preferred surface of an unmeasured object such as a machine, a household appliance, a heated material and a mammal, and the detected temperature can be read after a short period (even less than one second). All objects give off heat and emit thermal radiation. The wavelength of the thermal radiation generally ranges between three and fourteen micrometers. In optics, such thermal radiation rays are called infrared rays. The measuring principle of the infrared thermometer is to detect the radiation flux or the wavelength of the received infrared rays so as to figure out the object's temperature.

Especially during medical diagnosis, a clinical thermometer is very helpful to doctors. In comparison with the oral cavity, the anus or the armpit, the eardrum is known to have a temperature very near to that of the body's core temperature. The infrared thermometer can detect radiant heat of the infrared rays emitting from the eardrum through insertion into patient's ear canal so as to determine the temperature of the eardrum. Therefore, the infrared thermometer is becoming more and more popular, and shows great promise as an effective means for accurately measuring and displaying patient's eardrum temperatures very rapidly, typically within two seconds. In this regard, hospitals, clinics and families also replace conventional mercury thermometers with the infrared thermometers. However, the infrared thermometer probe for insertion into a patient's ear canal still contacts the patient's skin during measurement so that the probe is likely to be contaminated by the patient's secretions. Accordingly, the infrared thermometer is modified to be suitable for measuring the patient's forehead temperature. No matter what part of the patient or thermal radiation source is for measurement, the design principles of the infrared thermometers hardly vary.

Unfortunately, the infrared thermometer probe available on the medical market has either a large volume or an inaccurate measurement resulting from inadequate temperature transformation. For example, U.S. Pat. No. 4,895,164 entitled "Infrared Clinical Thermometer" discloses a probe assembly with a waveguide and an infrared detector being held in an isothermal state at ambient temperature by a heat-conducting block. The drawback of this approach is that a substantially large heat-conducting block is required so that the thermometer has a large volume unfavorable for handy use. In addition, an isothermal condition is not necessary in the design of a probe assembly. Since the surfaces of most waveguides are coated with a layer of gold, which has very high reflectivity and very low emissivity (around 10%), even though a temperature difference exists between the infrared detector and the waveguide, the infrared detector assembly receives little thermal radiation emitted from the inner wall of the waveguide. Furthermore, the property of the gold layer on the waveguide varies during a durable use period or between coating process parameters. Such uncertainty lessens the accuracy of the temperature measurement.

Figure 1:
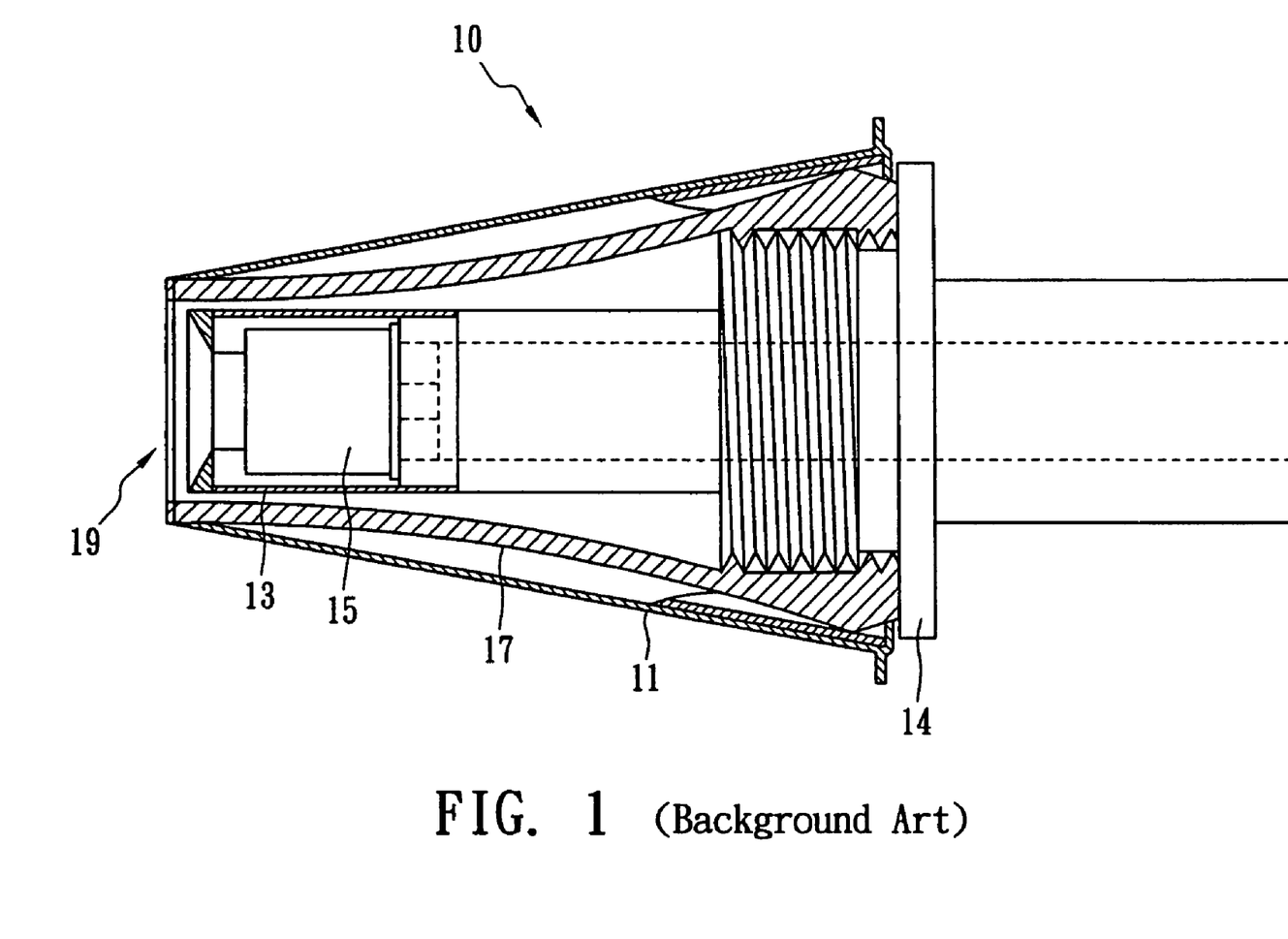
FIG. 1 is a cross-sectional view of the probe assembly disclosed by U.S. Pat. No. 5,018,872.

Instead of the aforesaid probe with the waveguide, U.S. Pat. No. 5,018,872 discloses a probe assembly 10 of another kind, as shown in FIG. 1. A transparent cover 11 is stretched over a whole trumpet-like plastic tube 17. A cylindrical shield 13 is inside the plastic tube 17 and adjacent to the left open end 19 of the plastic tube 17. An infrared radiation sensor 15 is located within the elongated portion of the plastic tube 17, and its base is against the end of a metallic heat sink 14. Therefore, the heat sink 14 can rapidly takes the heat accumulated on the infrared radiation sensor 15 from the tube's exterior so that the cold junction of the thermopile chip in the infrared radiation sensor 15 can be kept at a constant temperature.

However, it is necessary for the heat sink 14 to have a sufficiently large volume so as to rapidly conduct the heat from the cylindrical shield 13 and the plastic tube 17 to itself. Consequently, the infrared thermometer is too heavy to be handily held. On the other hand, because the heat sink 14, infrared radiation sensor 15 and plastic tube 17 are tightly combined with each other, the heat is easily and directly transferred through junctions between them. If the heat sink 14 does not have a sufficient volume, the temperature of the aforesaid cold junction is likely to have an immediate fluctuation. That is, the accuracy of the measured temperature is lessened. Since the heat sink 14 and infrared radiation sensor 15 directly contact each other through a large-area interface, external heat is absorbed by the heat sink 14 and cannot rapidly be conducted to the whole interior of the heat sink 14 so that the infrared radiation sensor 15 is also heated through the interface.

Referring to U.S. Pat. No. 6,292,685 (Pompei), Pompei discloses an infrared thermometer adapted to detect the temperature of a patient's forehead. Furthermore, the heat sink of the infrared thermometer is press fit in a plastic cap which is threaded on to a tubular head. Even though the infrared radiation sensor is separated from the heat sink by a ring, the heat sink directly heated by the plastic cap can cause the can thermal unbalance through thermal convection and thermal radiation after the plastic cap contacts patient's warm body or a heat source.

In conclusion, the medical market urgently requires a light and stable probe assembly so as to enable the infrared thermometer to be handily used and immediately display an accurate measured temperature.

SUMMARY OF THE INVENTION

An objective of the present invention is to provide a probe assembly of an infrared thermometer. The probe assembly can prevent its infrared radiation sensor from being heated by either conducted or convected heat energy from any radiation source or a patient's ear canal. Accordingly, the infrared radiation sensor merely detects thermal radiation rather than heat energy from other transfer ways and can accurately measure the temperature of a thermal radiation source and a patient's body.

Another objective of the present invention is to provide a simplified probe assembly. The total weight of the infrared thermometer is lightened; hence, it facilitates holding and operating the device.

Another objective of the present invention is to provide a simplified probe assembly. The probe assembly utilizes fewer components than a conventional one does; hence, the cost of it is reduced.

In order to achieve the objective, the present invention discloses a probe assembly of an infrared thermometer that is capable of detecting the surface temperature of a thermal radiation source and is suitable for holding over human skin or inserting into a patient's ear canal for accurately taking human body temperature. The probe assembly comprises a taper plastic tube, a conductive shell, an infrared radiation sensor and an adiabatic supporter, wherein the plastic tube has a radiation collection end and the conductive shell has a first open end. The infrared radiation sensor is placed in the first open end of the conductive shell, and has a base against the adiabatic supporter. The infrared radiation sensor has a hot junction toward the first open end of the conductive shell and a cold junction toward the adiabatic supporter.

BRIEF DESCRIPTION OF THE DRAWINGS

The invention will be described according to the appended drawings in which.

PREFERRED EMBODIMENT OF THE PRESENT INVENTION

Figure 2:
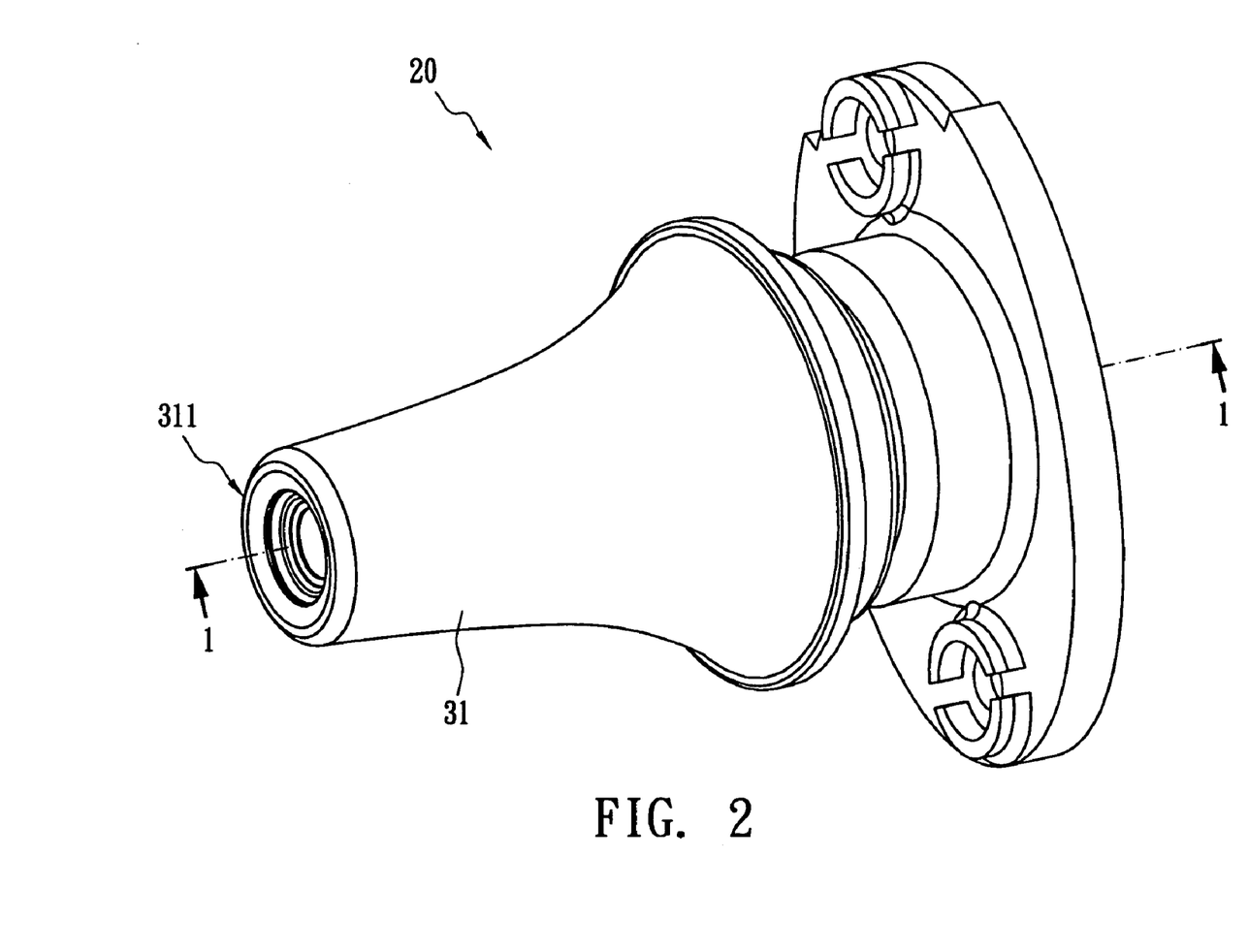
FIG. 2 is a perspective view of the probe assembly in accordance with the preferred embodiment of the invention.

FIG. 2 is a perspective view of the probe assembly in accordance with the preferred embodiment of the invention. The outside of the probe assembly 20 is a taper plastic tube 31 whose radiation collection end 311 can be inserted into an object such as an opening of a machine and a patient's ear canal waiting for temperature measurement. The radiation collection end 311 can receive infrared radiation from the unmeasured object.

Figure 3:
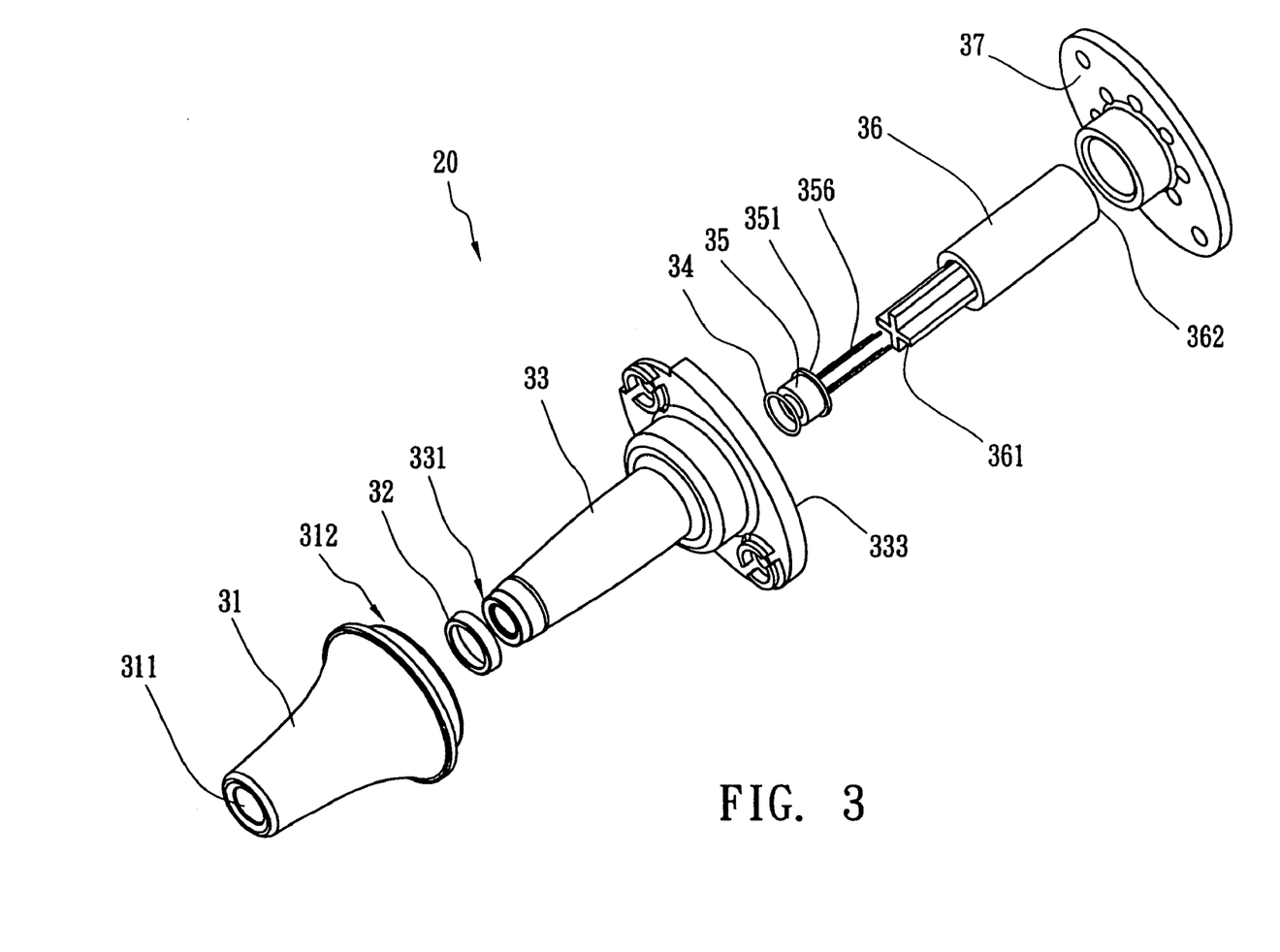
FIG. 3 is an exploded view of the probe assembly in accordance with another preferred embodiment of the invention.

FIG. 3 is an exploded view of the probe assembly in accordance with another preferred embodiment of the invention. The probe assembly 20 comprises the taper plastic tube 31, a conductive shell 33, an infrared radiation sensor 35 and an adiabatic supporter 36. The adiabatic supporter 36 and conductive shell 33 are fixed to a connection base 37 so that the infrared radiation sensor 35 can be limited to the first open end 331 of the conductive shell 33. A first adiabatic ring 32 is placed between the radiation collection end 311 of the plastic tube 31 and the first open end 331 of the conductive shell 33. Similarly, a second adiabatic ring 34 is placed between the first open end 331 of the conductive shell 33 and the infrared radiation sensor 35.

Figure 4:
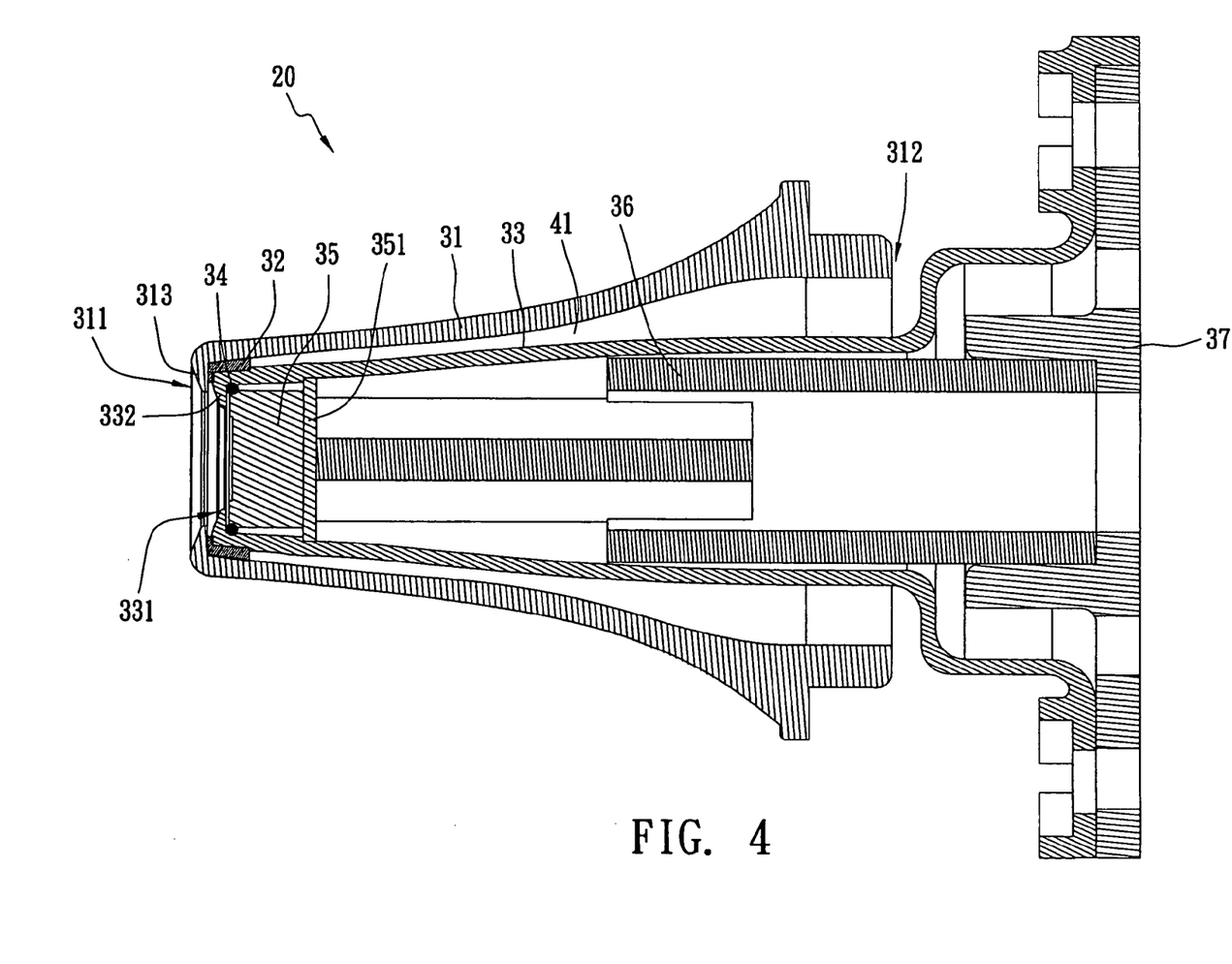
FIG. 4 is a cross-sectional view taken along the line 1-1 in FIG. 2.

In comparison with FIG. 3, FIG. 4 is a cross-sectional view taken along the line 1-1 in FIG. 2. Because the first adiabatic ring 32 is placed between the first guard ring 313 of the plastic tube 31 and the conductive shell 33, it can prevent the heat of the plastic tube 31 from being directly conducted to the conductive shell 33. The first guard ring 313 vertically extends from the plastic tube 31 toward the radiation collection end 311 so that it firmly holds the first adiabatic ring 32 and the conductive shell 33. There is an annular space 41 existing between the conductive shell 33 and the encircling plastic tube 31. Furthermore, the first adiabatic ring 32 is regarded as the closed end of the annular space 41. A second open end 312 is opposite to the closed end. Even though air in the annular space 41 is heated by the heated plastic tube 31, heat convection between outer and inner air of the annular space 41 through the second open end 312 reduces the heat transferred to the conductive shell 33.

The infrared radiation sensor 35 is placed inside the first open end 331 of the conductive shell 33, and its base 351 is against the adiabatic supporter 36 also placed in the conductive shell 33. Furthermore, the second adiabatic ring 34 not only holds the front rim of the infrared radiation sensor 35 but also prevents the heat from being conducted from the second guard ring 332 of the conductive shell 33 to the infrared radiation sensor 35. The second guard ring 332 improves the holding force for fixing the infrared radiation sensor 35.

Referring to FIG. 3, the base 351 of the infrared radiation sensor 35 is against the first end 361 of the adiabatic supporter 36 toward the radiation collection end 311, and is limited by the second adiabatic ring 34. The first end 361 of the adiabatic supporter 36 looks like a cross. Several leads 356 of the infrared radiation sensor 35 straddle the cross and go through its diagonal gaps. Furthermore, the second end 362 of the adiabatic supporter 36 and the second end 333 of the conductive shell 33 are together fixed to the connection base 37. Therefore, the infrared radiation sensor 35 is completely confined to the interior of the first open end 331 of the conductive shell 33. The side rim of the base 351 is against the inner wall of the conductive shell 33, and accordingly the infrared radiation sensor 35 is further positioned.

In comparison with the probe assembly 10 shown in FIG. 1, the plastic tube 31, the conductive shell 33 and the infrared radiation sensor 35 of the present probe assembly 20 do not tightly contact each other. The first adiabatic ring 32 and the second adiabatic ring 34 respectively separate them from each other.

Figure 5:
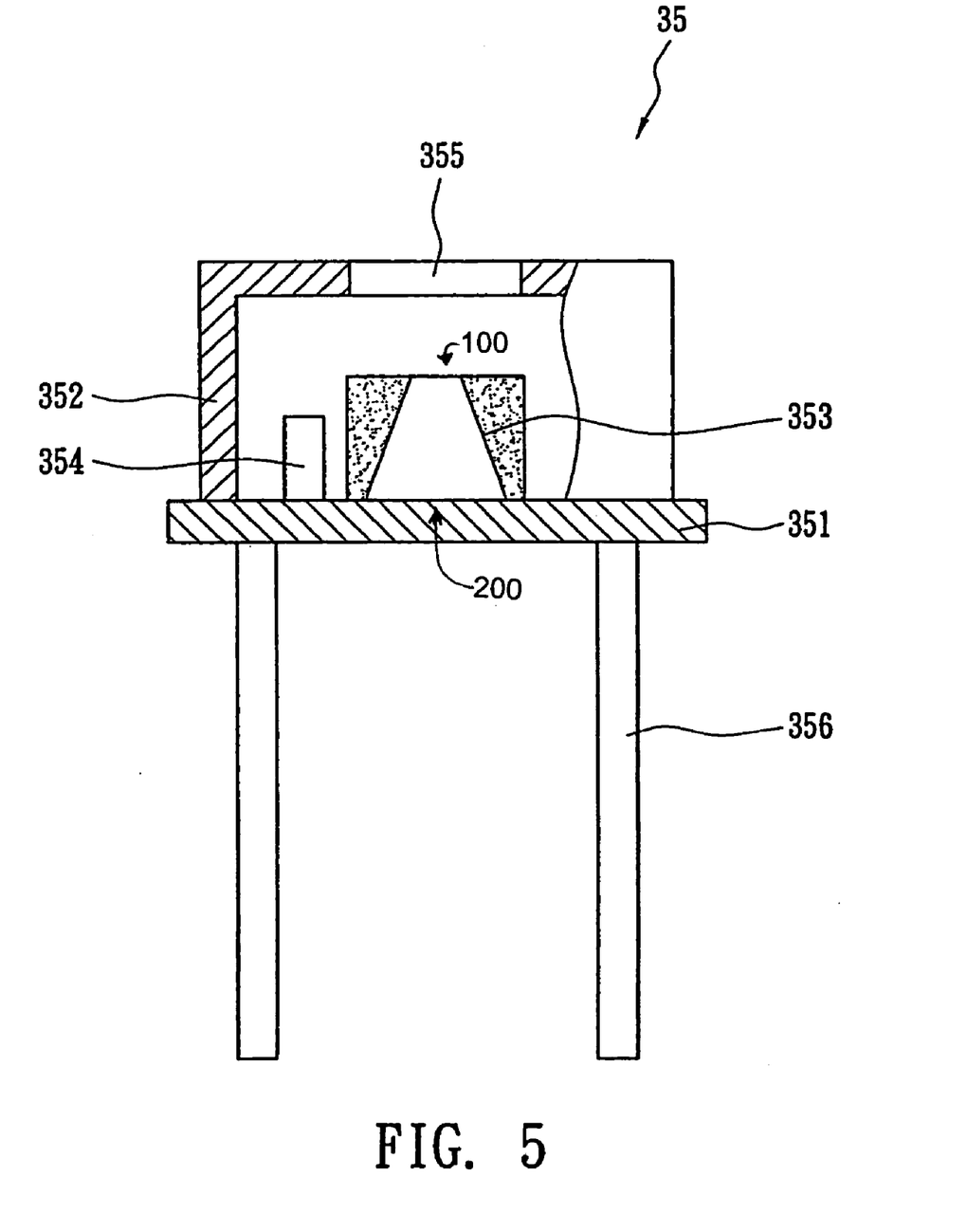
FIG. 5 is a cross-sectional view of the infrared radiation sensor in FIG. 3.

FIG. 5 is a cross-sectional view of the infrared radiation sensor. The infrared radiation sensor 35 comprises a metal shell 352, an infrared filter 355, a thermopile chip 353, a thermistor 354, a base 351 and a lead wire 356. Thermal radiation from a patient's ear canal is detected by the thermopile chip 353 through the infrared filter 355. The cold junction temperature of the thermopile chip 353 is detected by the thermistor 354. The thermistor 354 and the thermopile chip 353 are mounted on the base 351. Furthermore, the hot junction 100 of the thermopile chip 353 is the surface adjacent to the infrared filter 355, and can detect the energy of the thermal radiation. That is, the hot junction of the infrared radiation sensor 35 is toward the first open end 331 of the conductive shell 33, and the cold junction 200 of the infrared radiation sensor 35 is toward the adiabatic supporter 36.

Figure 6:
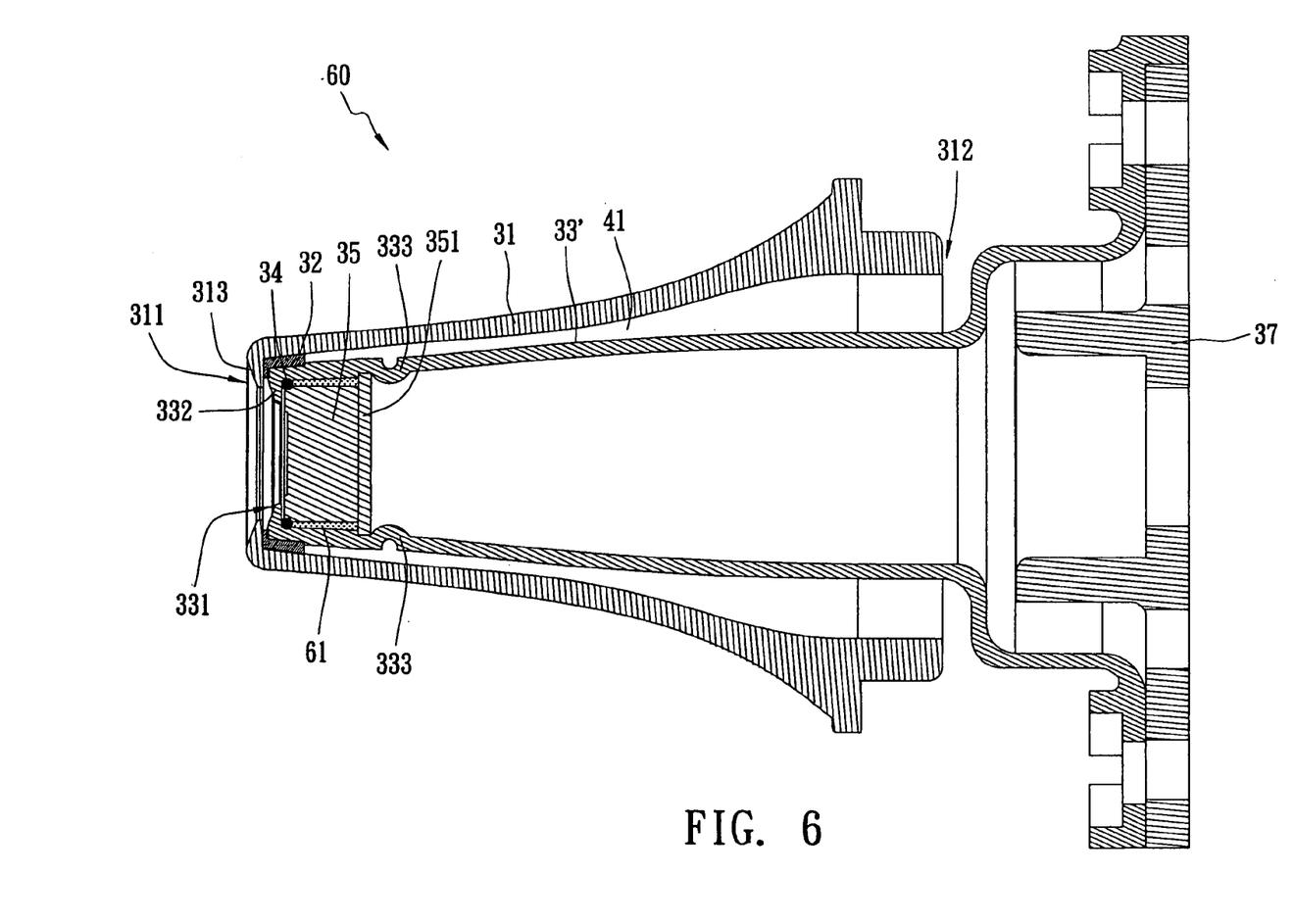
FIG. 6 is a cross-sectional view of the probe assembly in accordance with another preferred embodiment of the invention.

FIG. 6 is a cross-sectional view of the probe assembly in accordance with another preferred embodiment of the invention. In comparison with FIG. 4, the probe assembly 60 utilizes several bumps 333 formed on the conductive shell 33 and the second guard ring 332 to firmly hold the infrared radiation sensor 35, hence it is not in need of the adiabatic supporter 36. After the infrared radiation sensor 35 is put into the conductive shell 33, the bumps 333 are formed by a mechanical process such as a punching action. Furthermore, instead of interference with the bumps, the infrared radiation sensor 35 and the conductive shell 33 are adhered to each other by adiabatic adhesive 61 in a manner that has a low cost.

Figure 7:
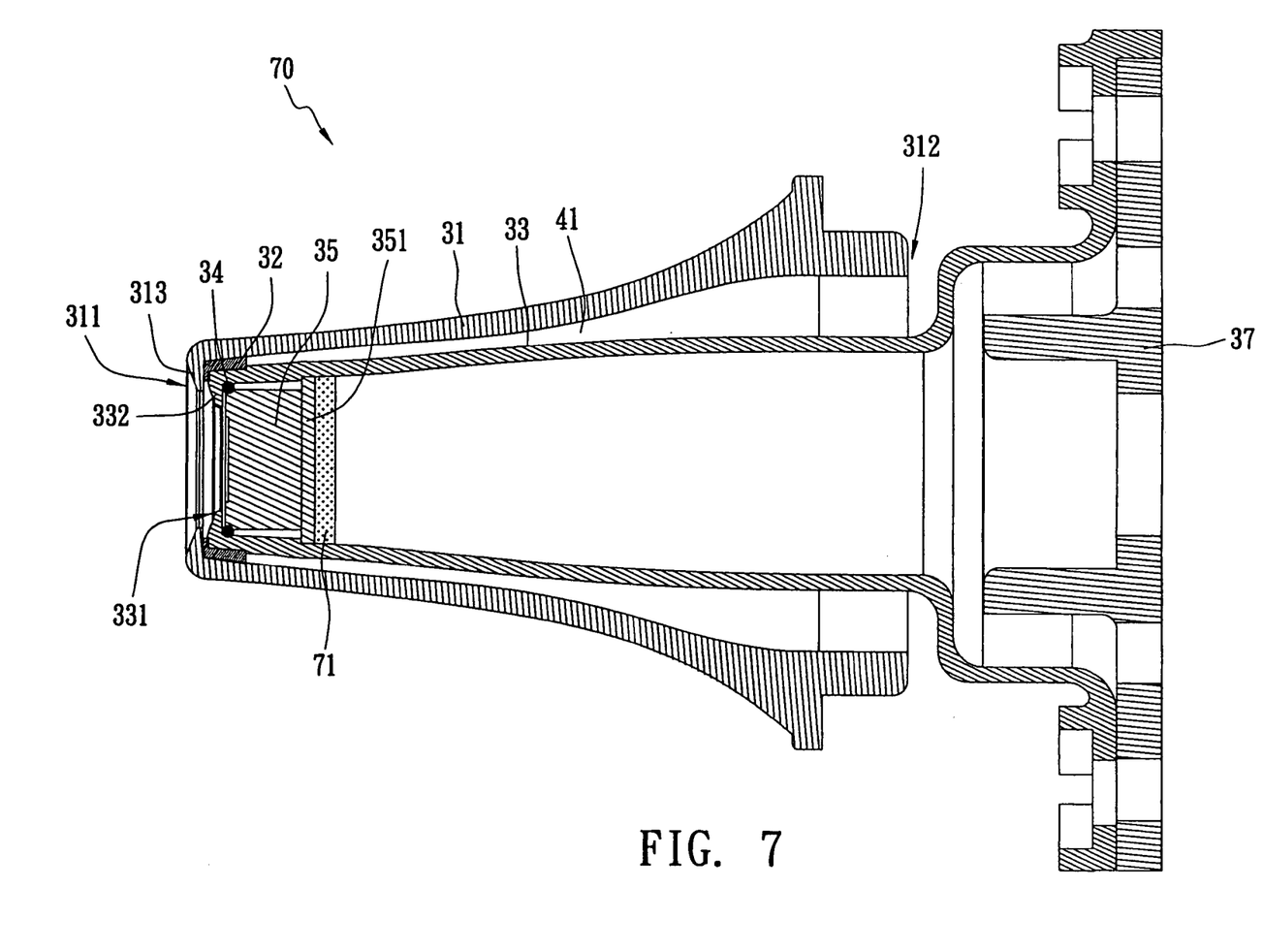
FIG. 7 is a cross-sectional view of the probe assembly in accordance with another preferred embodiment of the invention.

In addition to the aforesaid methods, as shown in FIG. 7, the probe assembly 70 can also use a fixing plate 71 to support the base 351 of the infrared radiation sensor 35. The periphery of the fixing plate 71 interferes with the inner wall of the conductive shell 33. Similarly, the infrared radiation sensor 35 is firmly fixed.

The aforesaid embodiments can clearly demonstrate that the conductive shell 33 prevents the infrared radiation sensor 35 from being heated through convection and conduction from a thermal radiation source or a patient's ear canal, and the infrared radiation sensor 35 only detects thermal radiation, not other heat transfer ways such as convection and conduction. Therefore, the temperature of the thermal radiation source or the human body can be accurately measured.

The above-described embodiments of the present invention are intended to be illustrative only. Numerous alternative embodiments may be devised by persons skilled in the art without departing from the scope of the following claims.

What is claimed is:

1. A probe assembly of an infrared thermometer detecting infrared rays emitted by a thermal radiation source so as to measure a surface temperature of the thermal radiation source, comprising:

a taper plastic tube including a radiation collection end toward the thermal radiation source and allowing the infrared rays to go through;

a conductive shell placed in the plastic tube and including a first open end adjacent to the radiation collection end;

an infrared radiation sensor placed in the first open end of the conductive shell and including a hot junction facing the thermal radiation source and a cold junction facing a side opposite to the radiation collection end;

a first adiabatic ring placed between the plastic tube and the conductive shell and preventing heat of the plastic tube from being directly conducted to the conductive shell;

a second adiabatic ring placed between the conductive shell and the infrared radiation sensor; and an adiabatic supporter placed in the conductive shell and including a first end against the surface of the infrared radiation sensor adjacent to the cold junction, wherein the first end of the adiabatic supporter shows a cross shape and several leads go through diagonal gaps of the cross shape.

2. The probe assembly of claim 1, further comprising a connection base holding the adiabatic supporter and the conductive shell, wherein a second end of the adiabatic supporter opposite to the first end and a second open end of the conductive shell opposite to the first open end are all fixed to the connection base.

3. The probe assembly of claim 1, wherein an annular space existing between the conductive shell and the plastic tube is an open space allowing air to convect from the interior of the annular space to the exterior of the annular space so that heat is prevented from being directly conducted from the plastic tube to the conductive shell.

4. The probe assembly of claim 1, wherein several bumps formed on an inner wall of the conductive shell hold the infrared radiation sensor.

5. The probe assembly of claim 1, wherein the infrared radiation sensor is fixed to the conductive shell by adiabatic adhesive.

6. The probe assembly of claim 1, further comprising a fixing plate supporting the surface of the infrared radiation sensor adjacent to the cold junction and interfering with an inner wall of the conductive shell to fix the infrared radiation sensor.

7. The probe assembly of claim 1, wherein the plastic tube includes a first guard ring at a rim of the first open end and the second adiabatic ring is placed between the first guard ring and the infrared radiation sensor.

8. The probe assembly of claim 1, wherein the conductive shell includes a second guard ring at a rim of the radiation collection end and the first adiabatic ring is placed between the second guard ring and the plastic tube.

* * * * *